Dec. 18, 1962  F. F. YOUNG  3,068,671
METHOD OF MAKING BIFOCAL LENSES
Filed Jan. 26, 1959
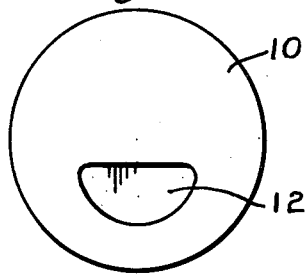
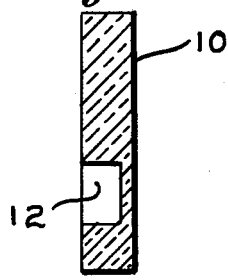
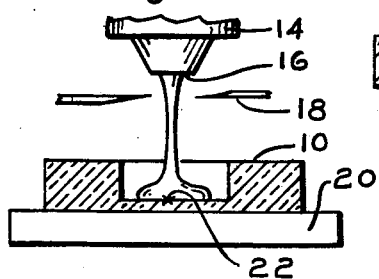
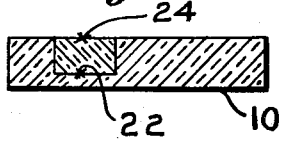
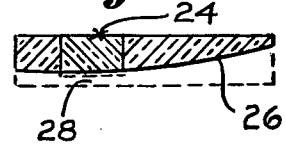
INVENTOR.
FLETCHER F. YOUNG
BY Clarence R. Patty Jr.
ATTORNEY 3,068,671
Patented Dec. 18, 1962

3,068,671
METHOD OF MAKING BIFOCAL LENSES
Fletcher F. Young, Harrodsburg, Ky., assignor to Corning Glass Works, Corning, N.Y., a corporation of New York
Filed Jan. 26, 1959, Ser. No. 788,971
1 Claim. (Cl. 65—39)

This invention relates to a method of making fused segment assemblies for use in the manufacture of bifocal lenses.

Bifocal lenses are made by a great variety of methods, but a method which is commonly employed is distinguished from others in that it employs a carrier, produced from a glass identical to that which is used for the major element of the lens, having formed therein a cavity the walls of which are substantially perpendicular to the face of the carrier and which may be of any desired shape and may extend completely through the carrier or only partially therethrough. Segment inserts of another glass, usually having a higher refractive index, are separately made having substantially the same size and shape as the cavity in the carrier. These segment inserts are then ground on their edges which are to contact the walls of the cavity of the carrier to produce a very close fit between the carrier and the insert, whereupon they may be fused into a single unitary structure known as a fused segment assembly. One surface of the segment assembly is thereafter ground to the desired curvature which corresponds to a similar curved depression ground into the major element. The ground surface of the segment assembly is thereupon placed in the depression of the major element and fused thereto by the application of heat. Thereafter, both faces of the bifocal lens are ground to the desired final curvature.

As can be appreciated, the manufacture of the segment inserts to the exact shape and size of the cavity in the carrier is a difficult operation. Likewise, the subsequent grinding of edges of the segment inserts and grinding or sandblasting of the carrier cavity walls are expensive and time-consuming operations in that a particular segment insert must be ground to fit the cavity of a particular carrier. It has also been found that the percentage of satisfactory fused segment assemblies resulting from this method of manufacture is very low; a large percentage being rejected because of failure to obtain complete fusion of the side walls of the segment insert to the side walls of the cavity in the carrier.

An object of this invention is to simplify the production of fused segment assemblies.

Another object of this invention is to provide a method for obtaining greater uniformity in sealing segments to carriers.

I have now found that the above objects can be achieved by preheating the carrier having the desired cavity therein to a temperature above its annealing point but below its softening point, shearing a stream of molten segment glass, placing the preheated carrier with its cavity facing upwardly, beneath the orifice of a glass melting unit from which said stream is flowing, flowing said sheared stream of glass into said cavity, depositing the shear mark on the bottom plane of the cavity and allowing the glass to continue to flow until sufficient glass to fill the cavity has flowed between the shearing means, shearing the stream of molten glass, pressing the surface of the still molten segment glass to force said segment glass into intimate contact with the walls of the carrier cavity, and thereafter annealing the fused segment assembly.

This invention is more fully described hereinafter and in the accompanying drawings wherein FIG. 1 is a plan view of a carrier having therein a segment cavity, FIG. 2 is a sectional, elevation view of FIG. 1, FIG. 3 illustrates the method of making the fused segment assembly by filling the cavity with molten glass according to this invention, and FIGS. 4–6 illustrate the method by which the fused segment assembly made by this process is utilized in the manufacture of the bifocal lens. FIG. 7 illustrates in a sectioned elevation view, an alternative form for the carrier.

The carrier is heated to a temperature above its annealing point but below its softening point by any suitable means, preferably, by placing it on a flat refractory support and placing it in a lehr for a sufficient time to heat it to the desired temperature. A segment glass is melted in any type of conventional optical melting unit having a bottom orifice through which a stream of homogeneous, molten glass, of suitable cross-sectional area can flow vertically downward. The carrier is removed from the preheating means, the molten stream is sheared, and the cavity in the carrier is placed directly beneath the molten stream. The stream of molten glass thereby impinges on the bottom plane of the cavity in the carrier and then flows to the walls of the cavity and up the walls, and when sufficient volume of glass has flowed between the shearing means to fill the entire cavity the stream is again sheared and thus the second shear mark is located on the top surface of the segment. The segment glass, while still in a fluid condition, is then subjected to a pressure of about 10 p.s.i. on its upper surface to force the segment glass into uniform and intimate contact with the walls of the carrier. The fused segment assembly is then annealed in the usual manner.

While the rate of flow of molten segment glass into the cavity of the carrier can be at any desired rate, the cross-sectional area of the molten stream must be small enough in relation to the cross-sectional area of the cavity that the stream impinges only on the bottom plane of the cavity or, as the stream continues to flow, on previously deposited segment glass. This insures that the shear mark will be positioned in such a location that it can be removed by grinding before incorporation into the final bifocal lens and, furthermore, it prevents air from being trapped between the segment glass and the side walls of the carrier by progressively forcing the air in the cavity out the top of the cavity.

Any glass compositions may be used for either the segment or the carrier which have heretofore been used to make the segments and carriers individually. The criteria which has heretofore been used in selecting suitable combinations has been found that segment glasses having an expansion of about 90–100% of the desired carrier glass are suitable.

A specific example of the method of this invention is hereafter set forth for the purposes of illustration and not by way of limitation of the scope of this process. A carrier 10 containing a cavity 12 therein, as illustrated in FIGS. 1 and 2, is prepared in the usual fashion from a glass having a softening point of 726° C. and an annealing point of 543° C. (The term "softening point" means the temperature at which glass has a viscosity of $10^{7.6}$ poises, Jour. Am. Cer. Soc., vol. 14, pages 502–511 (1931), and the term "annealing point" means the temperature at which the glass has a viscosity of $10^{13.0}$ poises, Jour. Am. Cer. Soc., vol. 37, pages 111–117 (1954).) The preformed carrier is then placed on a refractory block so that the cavity in the carrier is facing upwardly and the carrier and refractory block are placed in a pre heating lehr and heated to a temperature of 635° C. A suitable segment glass is melted in a conventional optical glass melting unit 14 having a bottom orifice 16 wherein the homogeneous molten glass is delivered to the orifice at a suitable working temperature so that it has a viscosity of between about $10^{2.8}$–$10^{3.3}$ poises. A stream of the molten segment glass is sheared by conventional shearing means 18 located directly below the orifice and the refractory block 20 with the carrier 10 thereon is removed the preheating lehr and placed directly below the sheared molten segment glass so that the shear mark 22 of the segment glass impinges upon the bottom plane of the cavity in the carrier. The stream of molten segment glass is allowed to flow into the cavity of the carrier until at least sufficient glass to fill the cavity has passed between the shearing means whereupon the stream is sheared. While it is important that enough segment glass flows into the cavity to completely fill it in order that the fused segment assembly will be suitable for the intended purpose, an excess of molten segment glass is not detrimental other than it increases the amount of grinding necessary in the final processing steps. As soon as the cavity has been filled with the segment glass it is immediately removed from beneath the melting furnace and place in a press where the surface of the segment glass is subjected to a pressure of 7 p.s.i. while the segment glass is still hot enough to have a viscosity of only about $10^4$–$10^5$ poises. The fused segment assembly is then removed from the press and placed in an annealing lehr to cool it to room temperature.

The finished fused segment assembly, as shown in FIG. 4, has a lower shear mark 22 in the segment glass at its interface with the bottom plane of the original cavity in the carrier and an upper shear mark 24 which is above the final surface of the fused segment assembly which will be utilized in the bifocal lens. The lower surface of the fused segment assembly is then ground to the desired curvature 26 as is shown in FIG. 5. This grinding operation removes the carrier web 28 (that portion of the carrier between the bottom plane of the cavity in the subcarrier and the bottom plane of the carrier) and enough of the bottom portion of the segment glass so that the bottom shear mark is thereby removed. The thus ground fused segment assembly is then placed in a concave depression of the major element 30 as is shown in FIG. 6 and then fused thereto by heating. The surface of the major element containing the fused segment assembly is thereupon ground to the desired curvature. This final grinding operation removes the upper shear mark of the segment glass.

FIG. 7 illustrates an alternative form of a carrier 10' which does not have a web portion as the cavity 12' passes completely through the carrier.

What is claimed is:

In the method of making a bifocal lens comprising forming a carrier segment to the desired size and shape, said carrier segment containing a cavity therein, the walls of said cavity being substantially perpendicular to at least one surface of the carrier, fusing a button segment to the walls of the carrier cavity to form a fused segment assembly, grinding one surface of the fused segment assembly to impart the desired curvature to the surface of the assembly, positioning the thus ground surface of the fused segment assembly in the depression within a major element, heating the lens assembly thereby formed to a sufficiently high temperature to fuse the segment assembly to the major element, and thereafter grinding the exposed surface of the button and the corresponding surface of the major element to impart the desired curvature thereto, the improvement which comprises simultaneously forming and fusing the button within the cavity of the carrier by heating the carrier to a temperature above its annealing point but below its softening point, positioning the carrier with the cavity therein facing upwardly for horizontal movement relative to a descending stream of molten glass, said stream having a cross-sectional area less than the cross-sectional area of the cavity in the carrier, interrupting the stream by shearing above the horizontal plane of movement of the carrier, moving the carrier beneath the sheared stream of molten glass to so position the carrier that the initial shear mark on the descending stream of molten glass impinges on the bottom plane of the cavity, shearing the stream of glass after sufficient glass to fill the cavity has descended between the shearing means whereby the shear mark is deposited above the level of the finished lens surface, removing the composite carrier from beneath the stream of molten glass, pressing the surface of the molten glass while it is still at a temperature above its softening point to fuse it uniformly to the walls of the carrier cavity and thereafter annealing the fused segment assembly, the subsequent grinding of the fused segment assembly and of the finished lens being of sufficient amount that each grinding operation removes a shear mark from the button element.

References Cited in the file of this patent

UNITED STATES PATENTS

| | | |
|---|---|---|
| 1,165,978 | Kinnear | Dec. 28, 1915 |
| 2,059,767 | Bausch | Nov. 3, 1936 |
| 2,112,659 | Reh | Mar. 29, 1938 |
| 2,182,537 | Haussmann | Dec. 5, 1939 |
| 2,433,013 | Ziegler | Dec. 23, 1947 |
| 2,704,010 | Lantz et al. | Mar. 15, 1955 |
| 2,734,315 | Poundstone | Feb. 14, 1956 |

FOREIGN PATENTS

| | | |
|---|---|---|
| 739,341 | Great Britain | Oct. 26, 1955 |